July 19, 1960 V. HOLZINGER 2,945,409
PIPE ORGAN
Filed April 1, 1957

INVENTOR.
VAL HOLZINGER
BY Thomas P. Mahoney
ATTORNEY.

United States Patent Office 2,945,409
Patented July 19, 1960

2,945,409

PIPE ORGAN

Val Holzinger, 3044 Walnut Grove,
South San Gabriel, Calif.

Filed Apr. 1, 1957, Ser. No. 649,702

9 Claims. (Cl. 84—348)

This invention relates to a pipe organ and, more particularly, to a pipe organ of an extremely compact nature which can be manufactured and sold at a relatively low cost and still achieve effects obtainable only by much more expensive, larger, and complicated pipe organs.

It is, therefore, an object of my invention to provide a pipe organ which is characterized by the compactness of the various component parts and which includes a reservoir disposed in a horizontal plane and having a pipe chest disposed in overlying relationship therewith, said reservoir and said pipe chest being connected at one extremity by a support which is hollow and which thus provides a fluid passage between the reservoir and the pipe chest.

One of the longest and largest pipes in a pipe organ is the tremolo conduit whereby tremolo effects are obtained and such tremolo conduits, in conventional organ constructions, occupy a considerable space which prevents a compact cabinet and housing from being achieved.

Another object of my invention is the provision of a pipe organ of the aforementioned character wherein the tremolo conduit is incorporated within the reservoir itself and thus does not occupy space external to the reservoir and pose a housing problem because of its great length.

Another object of my invention is the provision of a tremolo conduit in an organ of the aforementioned character wherein said tremolo conduit extends through the reservoir and through the fluid passage communicating with the pipe chest so that the tremolo conduit will terminate at and be maintained in fluid communication with said pipe chest. Therefore, the tremolo conduit is fully enclosed within the reservoir and the fluid passage creating fluid communication between the reservoir and the pipe chest and the problem of housing the tremolo conduit encountered in conventional organ constructions is eliminated.

Another problem encountered in the manufacture of low cost pipe organs is the provision of adequate valve control means for the various pipe valves and particularly important is the fact that such valves must be energized instantaneously when the key or pedal of the organ is depressed.

An additional object of my invention is the provision of a valve construction for association with a pipe in a pipe organ whereby the valve incorporates a fluid pressure motor energizable by a fluid pressure differential created thereacross and said pressure differential across the fluid pressure motor is created by an electrically energizable valve member associated with said fluid pressure motor.

More specifically, the valve construction of my invention includes an auxiliary pipe chest which is in communication with the reservoir of the organ and which has a plurality of bass pipes associated therewith, in the present embodiment of my invention. Each of the bass pipes has a valved passage and connected to each of the valves is a fluid pressure motor which is energizable by pressure within the auxiliary pipe chest.

Maintained in series relationship with the fluid pressure motor of each of the valves is an electrically energizable valve member which, when energized, exposes one side of the fluid pressure motor with which it is associated to atmospheric pressure, thus creating a pressure differential across the motor because of the greater pressure in the pipe chest to which the motor is exposed and thus causing energization of the associated valve.

Therefore, the valves are instantaneously energized by the air pressure in the pipe chest itself and the necessity for the provision of various complex types of motor actuators, such as bellows and the like, is dispensed with.

Other objects and advantages of my invention will be apparent from the following specification and the accompanying drawing which is for the purpose of illustration only and in which.

Figure 1:
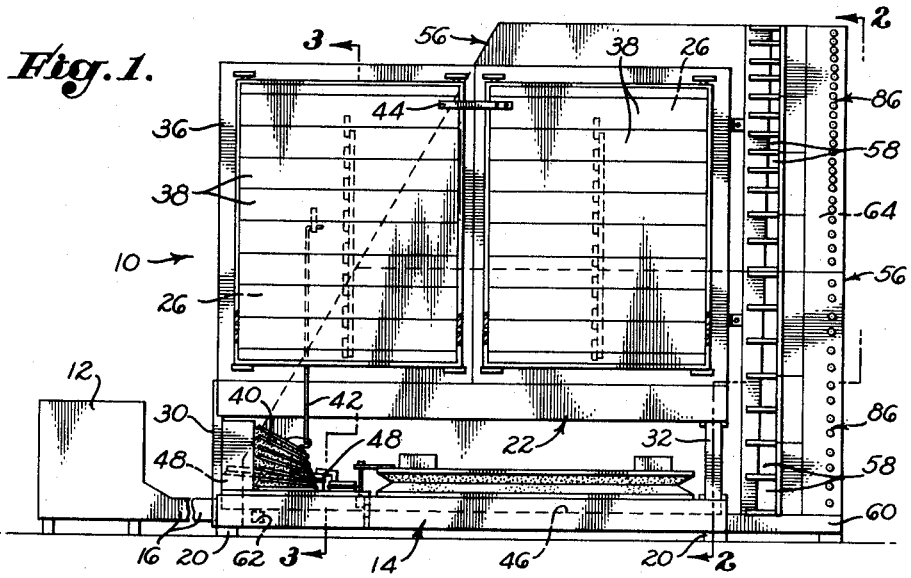
Fig. 1 is a front elevational view of a pipe organ constructed in accordance with the teachings of my invention.

Referring to the drawing and particularly to Fig. 1 thereof, I show a pipe organ 10 constructed in accordance with the teachings of my invention and including a blower 12 of conventional construction which is maintained in fluid communication with a reservoir 14 by means of a duct 16.

Figure 2:
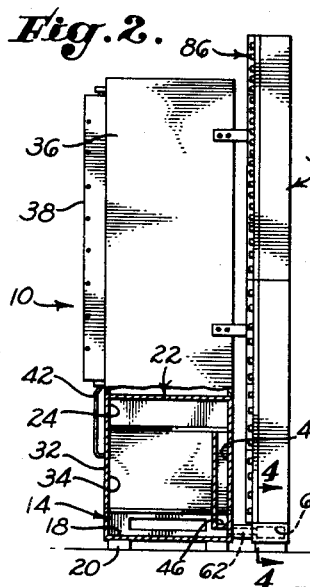
Fig. 2 is an end elevational view with portions thereof shown in section and taken on the broken line 2—2 of Fig. 1.
Figure 3:
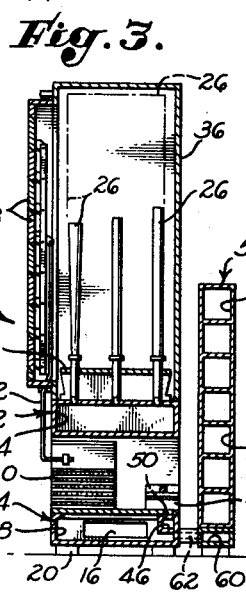
Fig. 3 is a vertical, sectional view taken on the broken line 3—3 of Fig. 1.

The reservoir 14, as best shown in Figs. 1–3 of the drawing, is of substantially rectangular configuration and has its major axis disposed in a horizontal plane. The reservoir 14 defines a fluid chamber 18 and is supported on feet 20.

Disposed in overlying relationship with the reservoir 14 is a pipe chest 22, said pipe chest also being of rectangular configuration and defining a fluid chamber 24 which has a plurality of pipes, such as the pipes 26, disposed in fluid communication therewith and maintained in vertical alignment by means of a supporting plate 28.

The reservoir 14 and the pipe chest 22 are supported in spaced relationship by means of supports 30 and 32 interposed between the opposite extremities thereof. The support 30 is of a solid construction, but the support 32 is of a rectangular cross section to define a fluid passage 34, as best shown in Fig. 2 of the drawing, said fluid passage establishing fluid communication between the right-hand extremity of the reservoir 14 and the right-hand extremity of the pipe chest 22, as best shown in Figs. 1 and 2 of the drawing.

Superimposed upon the pipe chest 22 and enclosing the pipes 26 is a swell chamber 36 which has conventional shutters 38 mounted on the front thereof and energizable by a swell engine 40 which is mounted upon the upper surface of the reservoir 14. The operative connection between the swell engine 40 and the shutters 38 is constituted by an elongated link 42 connected to the left-hand bank of shutters, as best shown in Fig. 1 of the drawing. The right-hand bank of shutters is operatively connected to the left-hand bank by a cross bar 44 and thus the energization of the swell engine 40 will cause simultaneous movement of the left and right-hand banks of the swell shutters 38 in a conventional manner.

Disposed within the reservoir 14 is an elongated, rectangular duct 46 or conduit which, as best shown in Figs.

1-3 of the drawing, has its left-hand extremity in communication with a tremolo bellows 48 and which constitutes the tremolo conduit of the organ 10. The elongated duct 46 constituting the tremolo conduit communicates with the bellows 48 through a passage 50, as best shown in Fig. 3 of the drawing, said passage 50 being formed in the top wall of the reservoir 14. The tremolo bellows 48 is of conventional construction and functions in substantially the same manner as the tremolo shown at 14 in Quave Patent No. 2,116,040, issued May 3, 1938.

The duct 46 constituting the tremolo conduit extends, as best shown by the dash line in Fig. 1 of the drawing, from one extremity of the reservoir 14 to the other extremity thereof and then, as best shown in Fig. 2 of the drawing, is directed upwardly at a right angle until the upper extremity thereof terminates in communication with the fluid chamber 24 defined by the pipe chest 22. Thus, the eight-foot tremolo conduit is completely enclosed within the reservoir 14 and the fluid chamber 18 defined thereby and within the support 32 and the fluid passage 34 defined by said support. In this manner, the problem of housing the elongated tremolo conduit encountered in conventional pipe organs is eliminated and the conduit is formed as an integral part of the reservoir 14 and the support 32 by the provision of the elongated duct 46 therein.

When it is desired to ship the organ 10, the various component parts thereof, such as the reservoir 14, the pipe chest 22, and the swell chamber 36, can be readily dismounted from operative relationship with one another and the separated components conveniently packaged for safe and economical shipment. Once the components have reached their destination, they can be readily assembled in the compact and space saving relationship shown in the various figures of the drawing.

Disposed in operative relationship with the previously described components of the pipe organ 10 is a rack 56 of bass pipes 58. An auxiliary pipe chest 60 is, as best shown in Figs. 2 and 3 of the drawing, maintained in fluid communication with the pipe chest 14 by means of a fluid passage 62 extending laterally therefrom.

Figure 5:
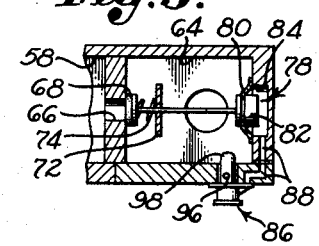
Fig. 5 is a transverse, sectional view taken on the broken line 5—5 of Fig. 4.
Figure 4:
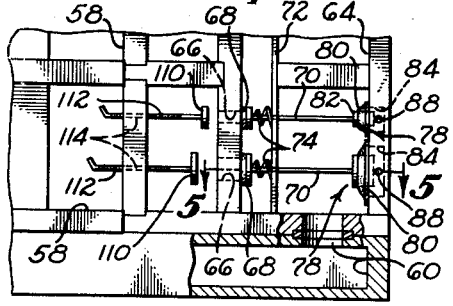
Fig. 4 is an enlarged, fragmentary view taken on the broken line 4—4 of Fig. 2.

The auxiliary pipe chest 60 is adapted to transmit air under pressure from the pipe chest 14 to an elongated fluid passage 64 disposed at one extremity of the pipes 58, as best shown in Figs. 4 and 5 of the drawing, and adapted to communicate therewith through ports 66. Associated with each of the ports 66 is a valve member 68, said valve member being mounted upon a shaft 70 supported in a guide bar 72 and being biased into operative relationship with a seat at the end of the associated port by means of a compression spring 74.

As long as the valve 68 is disposed in seated relationship with the associated port 66, no sound will be emitted from the pipe 58. In order to accomplish energization of the valve member 68, there is connected to the opposite extremity of the shaft 70 a fluid motor 78 which, as best shown in Fig. 5 of the drawing, includes a flexible diaphragm 80 operatively connected to a block 82 in which the shaft 70 is secured. The diaphragm 80 is disposed in overlying relationship with a fluid chamber 84 which is disposed in fluid communication with a valve 86 by means of a passage 88.

Figure 6:
Fig. 6 is an enlarged, fragmentary, sectional view of a portion of the valve mechanism of my invention.

The valve 86, as best shown in Fig. 6 of the drawing, includes a seat 90 normally engaged by a valve disc 92 to close a port 94 in communication with the ambient air. The upper side of the valve disc 92, as best shown in Fig. 6 of the drawing, is exposed to pressure within the passage 64 by means of a port 96 formed in the wall of the valve housing 98. Disposed within the valve housing 98 and in operative relationship with the valve disc 92 is an electromagnet 102 adapted to raise the valve disc 92 from operative relationship with the seat 90 and to place the passage 88 in fluid communication with the port 94, thus exposing the chamber 84 to ambient air pressure.

The electromagnet 102 is energizable from a suitable source of electrical potential, not shown, and when so energized the valve disc 92 is brought upwardly out of engagement with the seat 90. The upward movement of the valve disc 92 takes place despite the fact that it is exposed to the air pressure within the duct or passage 64. Upward movement of the valve disc 92 is accompanied by immediate inward movement of the diaphragm 80 since the chamber 84 is exposed to air at ambient pressure and thus the pressure within the passage 64 is sufficient to deflect the diaphragm 80 incorporated in the fluid motor 78 because of the pressure differential existing thereacross.

Energization of the fluid motor 78 in the above described manner will cause the shaft 70 to be longitudinally shifted in a right-hand direction, as viewed in Fig. 5 of the drawing, and thus shift the valve 68 to the right against the bias of the associated compression spring 74 to expose the associated port 66 of the pipe 58.

In this manner, the source of air and pressure utilized to feed the pipes 58 also accomplishes the energization of the valve members associated with said pipes by incorporating in the valve structure a fluid motor which is energizable by the air under pressure. Normally, the fluid motor is locked against movement by the air under pressure because of the fact that both sides of the diaphragm incorporated in the fluid motor are exposed to said pressure air, but energization of the electromagnetic valve to expose the one side of the fluid motor to ambient pressure creates a pressure differential across the fluid motor and causes energization of the associated valve.

Also provided in the structure disclosed immediately hereinabove is means for adjusting the pitch of the bass pipes 58, said means being constituted by an axially movable, cylindrical plug 110 which is mounted upon the inner extremity of an elongated screw 112, said screw, in turn, being mounted within a correspondingly threaded opening 114 in a support located adjacent the port 66. Therefore, by reaching in and rotating the screw 112, the cylindrical plug can be advanced toward or retracted from the port 66, thus regulating the volume of air under pressure passing into the pipe 58 through the port 66. By the provision of this simple means, the relatively complex structures previously utilized in conventional pipe organs to adjust the ports are eliminated.

As indicated hereinbelow, and as best shown in Figs. 3–6 of the drawings, the rack 56 of bass pipes 58 is fabricated with the working action constituted by the fluid passage 62 and the valve members 68 and valve motors 78 incorporated therein. Thus, the working action is fabricated as an integral part of the bass pipe rack 56 which constitutes a considerable advance over the prior art since the customary separation of the action from the pipes is eliminated with considerable savings in both complexity and size of the bass pipe structure.

I thus provide by my invention a pipe organ which is characterized by its relative simplicity of construction and compact size. The compact size of the pipe organ is attributable, in large part, to the superimposed relationship of various components thereof and to the incorporation in a novel manner of the tremolo conduit in the reservoir of the pipe organ and in the fluid passage connecting said reservoir with the pipe chest thereof. Also incorporated in my invention is a simple and effective valve construction whereby the valves of the pipes can be energized through the medium of a fluid motor which is operable when it is exposed to a fluid pressure differential.

I claim as my invention:

1. In a pipe organ, the combination of: a blower; an elongated reservoir connected to said blower; a pipe chest in fluid communication with said reservoir; a tremolo bellows; and an elongated tremolo conduit located within and extending through said reservoir along the major axis thereof and having one end terminating at said pipe chest and its other end terminating at said tremolo bellows.

2. In a pipe organ, the combination of: a blower; an elongated reservoir connected to said blower; a pipe chest in fluid communication with said reservoir; walls defining a fluid passage between said reservoir and said pipe chest; a tremolo bellows; and a tremolo conduit disposed within and extending through said reservoir and said passage and communicating with said pipe chest at one end and said bellows at its other end.

3. In a pipe organ, the combination of: a blower; an elongated reservoir connected to said blower, said reservoir having its major axis horizontally oriented; a pipe chest in fluid communication with said reservoir, said pipe chest having its major axis horizontally oriented; walls defining a fluid passage between said reservoir and said pipe chest; a tremolo bellows; and a tremolo conduit disposed within and extending through said reservoir and said passage and communicating with said pipe chest at one end and said bellows at its other end.

4. In a pipe organ, the combination of: a blower; an elongated reservoir connected to said blower, said reservoir having its major axis horizontally oriented; a pipe chest in fluid communication with said reservoir, said pipe chest having its major axis horizontally oriented; vertical walls defining a fluid passage between said reservoir and said pipe chest; a tremolo bellows; and a tremolo conduit disposed within and extending through said reservoir and said passage and communicating with said pipe chest at one end and said bellows at its other end.

5. In a pipe organ, the combination of: an elongated reservoir; an elongated pipe chest disposed in overlying relationship with said reservoir; supports maintaining said reservoir and chest in spaced relationship and one of said supports defining a fluid passage for establishing fluid communication between said chest and said reservoir; a tremolo bellows; and an elongated tremolo conduit disposed with said reservoir and said passage and communicating with said chest at one end and said bellows at its other end.

6. In a pipe organ, the combination of: an elongated reservoir; an elongated pipe chest disposed in overlying relationship with said reservoir; walls defining a fluid passage between said reservoir and said chest; a tremolo bellows; and an elongated tremolo conduit within said reservoir and said passage having its passage extremity in communication with said chest and its other extremity in communication with said bellows.

7. In a pipe organ, the combination of: a reservoir; a pipe chest; walls defining a fluid passage connecting said reservoir and said chest; a tremolo bellows; and a tremolo conduit extending through said reservoir and said passage into communication with said chest at one extremity and said bellows at its other extremity.

8. In a pipe organ, the combination of: a reservoir, a pipe chest; walls defining a fluid passage connecting said reservoir and said chest; a tremolo bellows; and a tremolo conduit extending through said reservoir from one extremity to the other thereof and through said passage into communication with said chest at one extremity and said bellows at its other extremity.

9. In a pipe organ, the combination of: a reservoir; a pipe chest in fluid communication with said reservoir; a tremolo bellows; and a tremolo conduit disposed within said reservoir and having one end in fluid communication with said chest and its other end in fluid communication with said bellows.

References Cited in the file of this patent

UNITED STATES PATENTS

| | | |
|---|---|---|
| 1,262,640 | Cloetens | Apr. 16, 1918 |
| 1,622,364 | Barbieri | Mar. 29, 1927 |
| 1,692,507 | Lamontagne | Nov. 20, 1928 |
| 1,723,287 | Losh | Aug. 6, 1929 |
| 1,846,861 | Grant | Feb. 23, 1932 |
| 2,005,867 | Maag | June 25, 1935 |
| 2,116,040 | Quave | May 3, 1938 |
| 2,198,160 | Gollnick | Apr. 23, 1940 |

FOREIGN PATENTS

| | | |
|---|---|---|
| 433,774 | Great Britain | Aug. 20, 1935 |